United States Patent Office 3,156,727
Patented Nov. 10, 1964

3,156,727
DIHYDROXY DIAMINES AND THEIR PRODUCTION
Henri Sidi, Paramus, and William M. Kraft, Verona, N.J., assignors, by mesne assignments, to Heyden Newport Chemical Corporation, a corporation of Delaware
No Drawing. Filed Mar. 29, 1960, Ser. No. 18,262
12 Claims. (Cl. 260—573)

The present invention relates to novel amines and to their production. More particularly it relates to novel dihydroxy diamines and to a method for their production. It further relates to resinous compositions containing these dihydroxy diamines.

Specifically the invention relates to a series of dihydroxy diamines which are derived from allo-ocimene and which have the formula

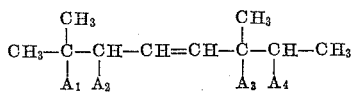

In this formula and in the succeeding formula two of the substituents $A_1$, $A_2$, $A_3$, and $A_4$ are hydroxyl groups; the other two are amino or substituted amino groups. In these compounds the combination of $A_1$ and $A_2$ contains one hydroxyl group and one amino group as does the combination of $A_3$ and $A_4$. These unsaturated dihydroxy diamines may be prepared by the reaction of allo-ocimene dioxide with ammonia or with a primary or secondary amine.

The hydrogenation of the unsaturated dihydroxy diamines yields a series of compounds which have the formula

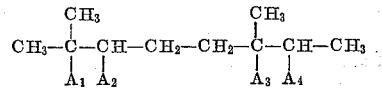

These saturated dihydroxy diamines are also within the scope of the present invention.

The allo-ocimene dioxide which is used as the starting material may be prepared by any convenient procedure. It may, for example, be prepared by the thermal depolymerization of polymeric allo-ocimene peroxide. This preparation has been carried out as follows: One hundred grams of freshly distilled allo-ocimene was allowed to stand in a loosely covered vessel at room temperature for 4 days. The resulting oxidized material, which weighed 116 grams, was dissolved in 100 ml. of diethyl ether. The ether solution was mixed with 500 ml. of ethanol to precipitate a white flocculent material which was then collected, washed with three 100 ml. portions of ethanol, and dried. The resulting polymeric allo-ocimene peroxide, which weighed 21.2 grams, was heated gradually to 65° C. at which point an exothermic reaction occurred which caused the temperature to rise to 145° C. When cooled to room temperature, the product was a pale yellow, mobile liquid. The crude allo-ocimene dioxide prepared in this way was distilled under reduced pressure. The main fraction, which has the formula $C_{10}H_{16}O_2$, distilled at 85.5°–87° C./2.5 mm. and had a density at 25° C. of 0.9492 and a refractive index at 25° C. of 1.4640. Either crude allo-ocimene dioxide or the distilled material may be used in the practice of the present invention.

Allo-ocimene dioxide may be reacted with a wide variety of nitrogen-containing compounds to form dihydroxy diamines. These include ammonia and primary and secondary aliphatic, aromatic, cycloaliphatic, alkylaromatic, arylaliphatic amines. A single nitrogen-containing compound or a mixture of two or more of these compounds may be used. Illustrative of the primary and secondary amines that may be reacted with allo-ocimene dioxide to form the novel dihydroxy diamines are the following: methylamine, ethylamine, n-propylamine, isopropylamine, n-hexylamine, n-dodecylamine, stearylamine, dimethylamine, diethylamine, di-n-propylamine, di-n-butylamine, di-sec.-butylamine, di-tert.-butylamine, distearylamine, methylethylamine, ethanolamine, diethanolamine, propanolamine, hexanolamine, aniline, toluidines, xylidenes, mesidine, chloroanilines, hydroxyanilines, anisidines, phenetidines, diphenylamine, N-methylaniline, benzylamine, β-phenylethylamine, cyclohexylamine, dicyclohexylamine, piperidine, morpholine, piperazine, ethylenediamine, propylenediamine, hexamethylenediamine, octamethylenediamine, phenylenediamine, and tolylenediamine.

When ammonia or a lower aliphatic amine is used, it may be supplied as substantially anhydrous gas or liquid or as a strong aqueous solution. Other amines may be added as such or as an aqueous solution or dispersion.

The conditions under which the reaction between allo-ocimene dioxide and ammonia or the amine is carried out are not critical, but can be varied within wide limits without affecting the course of the reaction. The reactants are generally stirred together at a temperature between approximately 10° and 120° C., and preferably between approximately 25° and 60° C., until the reaction is complete as is shown by clarification of the reaction mixture. Since the reaction is exothermic, it may be necessary in some cases to provide external cooling in order to maintain the reaction temperature within the desired range. The reaction may be carried out under atmospheric or superatmospheric pressure.

Either stoichiometrically equivalent amounts of the reactants or an excess of either allo-ocimene dioxide or the nitrogen-containing compound may be used in the reaction. We prefer to use an excess of the nitrogen-containing compound in order to obtain the maximum yield of the dihydroxy diamine and most often use approximately 3 moles to 10 moles of the nitrogen-containing compound for each mole of allo-ocimene dioxide. The action is preferably carried out in the presence of water.

Following the reaction, the product may be separated from the reaction mixture by any convenient procedure. For example, water and unreacted starting material may be removed from the product by distillation under reduced pressure. Alternatively, the product may be separated from the reaction mixture by solvent extraction. The resulting crude dihydroxy diamines may be purified, for example, by fractional distillation procedures. The product may be a single dihydroxy diamine or a mixture of two or more isomeric dihydroxy diamines. When a mixture of isomers is obtained, it may if desired be resolved by known means.

The unsaturated dihydroxy diamines may be converted to the corresponding saturated compounds by well-known hydrogenation procedures. They may, for example, be hydrogenated at elevated temperatures and at atmospheric or superatmospheric pressures in the presence of a catalyst and optionally a solvent. The catalyst may be any of the known hydrogenation catalysts, such as Raney nickel; finely-divided nickel, iron, or cobalt; platinum and palladium black; colloidal platinum and palladium; and the like. The conditions under which the hydrogenation is carried out, that is, temperature, pressure, amount of catalyst, etc., may be varied over a wide range without affecting the product formed.

The invention may be illustrated by the examples that follow. It is to be understood, however, that the examples are for the purpose of illustration and that the invention is not limited as to any of the specific materials or conditions cited therein.

EXAMPLE 1

A mixture of 168 grams (1 mole) of allo-ocimene dioxide and 600 ml. (9.9 moles) of 28% ammonium hydroxide solution was stirred at 25°–30° C. for 72 hours and was then heated to 120° C. under atmospheric pressure to remove water and unreacted ammonia. The residue was distilled under vacuum to yield 91.7 grams (45.4% yield) of diamino dihydroxy allo-ocimene, which distilled at 165°–172° C./4 mm. and which had a molecular weight of 198 (calculated for $C_{10}H_{22}O_2N_2$—202).

EXAMPLE 2

A mixture of 168 grams (1 mole) of allo-ocimene dioxide and 600 ml. (9.9 moles) of 28% ammonium hydroxide was placed in a 1000 ml. stainless steel rocket bomb. The bomb was flushed five times with anhydrous ammonia, and then sufficient ammonia was introduced to result in a pressure of 20 p.s.i. within the bomb. The reaction mixture was rocked and heated at 50°–60° C. for 4 hours. At the end of this period and after cooling, the reaction mixture was heated to 120° C. under atmospheric pressure to remove water and unreacted ammonia. The residue was heated under vacuum to yield 86.9 grams (43% yield) of diamino dihydroxy allo-ocimene which distilled at 160°–166° C./3 mm. and which contained 13.3% nitrogen (calculated, 13.8% nitrogen).

EXAMPLE 3

Diamino dihydroxy allo-ocimene, prepared by the procedure described in Example 2, was hydrogenated by the following procedure: A mixture of 20.2 grams of diamino dihydroxy allo-ocimene, 500 ml. of water, and 5 grams of Raney nickel was heated at 55°–60° C. and 100 p.s.i. with hydrogen. Absorption of the hydrogen was complete in about 30 minutes. The reaction mixture was then filtered to remove the catalyst and heated under atmospheric pressure to remove the water that was present. The residue was distilled under vacuum to give a 66.6% yield of hydrogenated diamino dihydroxy allo-ocimene which distilled at 160°–170° C./5 mm. and which contained 13.6% nitrogen (calculated for $C_{10}H_{24}O_2N_2$—13.7% nitrogen).

EXAMPLE 4

A mixture of 504 grams (3 moles) of allo-ocimene dioxide and 1860 grams (15 moles) of 25% monomethylamine solution was stirred for 3 hours during which time its temperature rose from 25° to 55° C. The reaction mixture was stirred for an additional 2 hours at 50°–55° C. Unreacted amine and water were then removed by heating the reaction mixture to 120° C. under atmospheric pressure. The residue was distilled under vacuum to give 586.8 grams (84.9% yield) of bis (monomethylamino) dihydroxy allo-ocimene which distilled at 138°–150° C./5 mm., which had a molecular weight of 222 (calculated for $C_{12}H_{26}O_2N_2$—230), and which had a nitrogen content of 12.0% (calculated for $C_{12}H_{26}O_2N_2$—12.1% nitrogen).

EXAMPLE 5

The bis(monomethylamino) dihydroxy allo-ocimene whose preparation was described in Example 4 was hydrogenated by the procedure of Example 3 to give a 78.6% yield of a product which distilled at 136°–144° C./3 mm. and which contained 11.8% nitrogen (calculated for $C_{12}H_{28}O_2N_2$—12.0% nitrogen).

EXAMPLE 6

A mixture of 252 grams (1.5 moles) of allo-ocimene dioxide and 1620 grams (9 moles) of a 25% aqueous dimethyl amine solution was stirred for 5 hours during which time its temperature rose from 25° to 50° C. The reaction mixture was heated under atmospheric pressure to 120° C. and then under reduced pressure (30 mm.) to 110° C. to remove water and unreacted amine. There was obtained 362.4 grams (93.7% yield) of crude bis (dimethylamino) dihydroxy allo-ocimene which contained 10.4% nitrogen (calculated for $C_{14}H_{30}O_2N_2$—10.8% nitrogen).

A 181.2 gram portion of the crude product was distilled to give 163.3 grams (84.3% yield based on allo-ocimene dioxide) of purified bis (dimethylamino) dihydroxy allo-ocimene, which distilled at 117°–122° C./4 mm.

EXAMPLE 7

A 51.6 gram portion of bis (dimethylamino) dihydroxy allo-ocimene was hydrogenated at 100° C. and 1000 p.s.i. in the presence of a Raney nickel catalyst and ethanol as solvent to give a 72% yield of a product which distilled at 129°–131° C./4 mm. and which contained 10.2% nitrogen (calculated for $C_{14}H_{32}O_2N_2$—10.7% nitrogen).

EXAMPLE 8

A mixture of 84 grams (0.5 mole) of allo-ocimene dioxide, 300 grams (5 moles) of ethylene diamine, and 300 ml. of water was stirred for one hour during which time its temperature rose from 25° C. to 45° C. The reaction mixture was stirred for an additional eighteen hours and was then heated under reduced pressure (30 mm.) to 170° C. to distill off water and unreacted amine. The residue, which was crude bis(ethylene diamino) dihydroxy allo-ocimene, was a viscous yellow oil.

EXAMPLE 9

A mixture of 84 grams (0.5 mole) of allo-ocimene dioxide, 200 grams (3.27 moles) of ethanolamine, and 50 ml. of water was stirred at 35°–43° C. of 4 hours. The reaction mixture was heated to 100° C./1 mm. to remove water and unreacted ethanolamine. The crude bis($\beta$-hydroxyethyl) dihydroxy allo-ocimene obtained contained 9.97% nitrogen (calculated for $C_{14}H_{30}O_2N_2$—9.65% nitrogen).

EXAMPLE 10

A mixture of 8.4 grams (0.05 mole) of allo-ocimene dioxide, 53.1 grams (0.1 mole) of distearylamine, and 300 ml. of water was heated at reflux temperature (100° C.) for 8 hours. At the end of this time, 300 ml. of toluene was added, and the organic layer was separated from aqueous layer. The product, which crystallized when the organic layer was cooled, was obtained in 36.5% yield.

EXAMPLE 11

A mixture of 250 grams (2.69 moles) of aniline, 84 grams (0.5 mole) of allo-ocimene dioxide, and 200 grams of water was heated at reflux temperature (100° C.) for 24 hours. After cooling, the organic layer was separated from the aqueous layer. The organic layer was then heated under reduced pressure (30 mm.) to 250° C. to remove unreacted aniline. The resulting crude bis (phenylamino) dihydroxy allo-ocimene was obtained in a 74.2% yield.

EXAMPLE 12

A mixture of 56 grams (0.33 mole) of allo-ocimene dioxide, 242.3 grams (2 moles) of N-benzyl methyl amine, and 121.2 grams of water was heated at reflux temperature (100° C.) for 13 hours. The reaction mixture was then heated to 140° C./0.6 mm. to remove water and unreacted amine. The crude bis(N-benzylmethylamino) dihydroxy allo-ocimene, which was obtained in an 89.7% yield, contained 6.3% nitrogen (calculated for $C_{26}H_{38}O_2N_2$—6.8% nitrogen).

EXAMPLE 13

A mixture of 84 grams (0.5 mole) of allo-ocimene dioxide, 261.3 grams (3 moles) of morpholine, and 200 ml. of water was stirred for 18 hours at 30°–350 C. The reaction mixture was then heated under reduced pressure (30 mm.) to 120° C. to remove water and unreacted morpholine. The crude bis (morpholino) dihydroxy allo-ocimene, which was obtained in a 98.6% yield, contained 8.1% nitrogen (calculated for $C_{18}H_{34}O_4N_2$—8.2% nitrogen).

EXAMPLE 14

A mixture of 84 grams (0.5 mole) of allo-ocimene dioxide, 255.3 grams (3 moles) of piperidine, and 250 ml. of water was stirred for 18 hours at 30°–35° C. The reaction mixture was then heated under reduced pressure (30 mm.) to 120° C. to remove water and unreacted piperidine. The crude bis(piperidino) dihydroxy allo-ocimene, which was obtained in a 93.1% yield, contained 7.6% nitrogen (calculated for $C_{20}H_{38}O_2N_2$—8.3% nitrogen).

EXAMPLE 15

A mixture of 67.2 grams (0.4 mole) of allo-ocimene dioxide, 46.2 grams (0.4 mole) of hexamethylene diamine, and 100 ml. of water was stirred for 11 days at room temperature. Upon removal of water by distillation under reduced pressure, 114 grams of an orange glassy solid was obtained.

EXAMPLE 16

A mixture of 33.6 grams (0.2 mole) of allo-ocimene dioxide, 14.8 grams (0.2 mole) of 1,3-propylene diamine, and 45 ml. of water was stirred at room temperature for 84 hours. The mixture was then heated under reduced pressure to remove water from it. The product, which weighed 46.1 grams, was a brown glassy solid which contained 11.14% nitrogen (calculated for $C_{13}H_{26}O_2N_2$—11.58% nitrogen).

The novel dihydroxy diamines may be used as chemical intermediates in a number of reactions. For example, they may be reacted with dicarboxylic acids to form resins. In addition they may be used in the preparation of a variety of quaternary ammonium compounds.

Both crude and purified saturated and unsaturated dihydroxy diamines prepared in accordance with the present invention have proven useful as catalysts in the preparation of polyurethane foams and as catalysts for anhydride-cured epoxy resins.

The polyurethane products in which these dihydroxy diamines may be used include both polyether urethane foams and polyester urethane foams. The polyether urethane foams are products of the reaction of alkylene oxide-modified polyhydric alcohols with an organic polyisocyanate in the presence of an amine catalyst. The polyhydric alcohols used in the preparation of these foams are generally di- or trihydric alcohols having molecular weights in the range of approximately 750 to 10,000. The polyester urethane foams are the products of the reaction with an organic polyisocyanate of a polyester resulting from the reaction of a glycol or a trihydric alcohol such as trimethylolpropane, with a dicarboxylic acid, such as adipic acid or sebacic acid. Any of the well-known organic polyisocyanates may be used in the preparation of these foams. Illustrative of these polyisocyanates are toluene-2-,4-diisocyanate, m-phenylene diisocyanate, 4-chloro-1,3-phenylene diisocyanate, 4,4¹-biphenlyene diisocyanate, and 1,6-hexamethylene diisocyanate. The amine catalyst is added in the amount of approximately 0.01% to 5%, preferably 0.1% to 2%, based on the weight of the polyester or polyhydric alcohol. Any of the novel dihydroxy diamines or a mixture of one or more of these compounds with another amine may be used to catalyze the reaction. In addition a catalyst promotor, such as dibutyl tin dilaurate, may be included in the catalyst mixture.

The following example illustrates the way in which a dihydroxy diamine derived from allo-ocimene may be used in the preparation of a polyurethane foam.

EXAMPLE 17

A polyether urethane foam was prepared using as catalyst a mixture of 0.6 gram of N-methylmorpholine, 0.05 gram of dibutyl tin dilaurate, and 0.1 gram of bis-(dimethylamino) dihydroxy allo-ocimene (the product of Example 6). This catalyst mixture and 2.9 grams of water were added to 0.7 gram of an organo-silicone copolymer (Silicone X–525, which is marketed by the silicones Division of Union Carbide Corporation), having a viscosity at 77° F. of ca. 900 cs., specific gravity 25°/25° of 1.03, pour point of —34° F., and surface tension of 19.1 dynes/cm. at 25° C. The resulting mixture was stirred until it was clear. The catalyst-silicone-water mixture was then added to 100 grams of Pluracol TP–4040 (atrihydric alcohol which has a molecular weight of 4040 and a hydroxyl number of 42.4 and which is marketed by Wyandotte Chemicals Corporation). This mixture was stirred vigorously for about 6 seconds. Then 37 grams of toluene-2,4-diisocyanate was added, and the mixture was stirred vigorously for about 6 seconds. The final mixture was poured into a mold, 5½ inches in height and 6 inches in diameter, which had been treated with a release agent. The foam was cured at 250° F. in a humid oven. The cured foam, which was 5⅛ inches in height, was very white and flexible and had a relatively small cell structure. It had a density of 3.1 lb./cu. ft. and a compression set at constant (50%) deflection (ASTM D–1564–58–T—Method B) of 11.9%.

When the above foam prepartion was repeated using as catalyst a mixture of 0.7 gram of N-methylmorpholine and 0.05 gram of dibutyl tin dilaurate, the product was a non-uniform, rigid foam about 1 inch in height.

The novel saturated and unsaturated dihydroxy diamines of the present invention may also be used as catalysts for anhydride-cured epoxy resins. They may be used with a wide variety of epoxy resins and acid anhydrides to form cured polyepoxide resins which have excellent thermal, mechanical and electrical properties. The useful epoxy resins are polyether derivatives of polyhydric alcohols or polyhydric phenols which are formed by the reaction of the polyhydric compound with epichlorohydrin. The epoxy resins may be saturated or unsaturated, aliphatic, cycloaliphatic, aromatic, or heterocyclic. Their 1,2-epoxy equivalency is at least 1.1 and is generally between 1.1 and 3, the 1,2-epoxy equivalency being the average number of 1,2-epoxy groups contained in a molecule of the resin. Illustrative of the acid anhydrides that may be used as curing agents for these epoxy resins are phthalic anhydride, maleic anhydride, hexachloroendomethylenetetrahydrophthalic anhydride, and succinic anhydride. Of particular value are dimethyl butenyl tetrahydrophthalic anhydride and its hydrogenated derivative, dimethyl butyl hexahydrophthalic anhydride, whose preparation and use as epoxy curing agents are described in our copending application Serial No. 766,189 which was filed on October 7, 1958. The acid anhydride is generally added in the amount of 0.8 to 1.2 equivalents for each equivalent of epoxide in the epoxy resin. The dihydroxy diamines may be added to the epoxy resin-acid anhydride composition in the amount of approximately 0.1% to 10% and preferably 1% to 5% based on the weight of the epoxy resin to catalyze the curing reaction. Epoxy resin compositions containing the dihydroxy diamines may be heated at a temperature in the range of about 80° to 200° C. to effect curing.

The epoxy resins prepared in accordance with the present invention may be used as adhesives or as laminating and impregnating varnishes for various papers, fabrics, and cloths. They may also be used in the prepaation of electrical pottings and castings.

The use of the novel dihydroxy diamines as catalysts for anhydride-cured epoxy resins is illustrated by the following example.

EXAMPLE 18

A series of epoxy resins was prepared in which the catalysts were the novel dihydroxy diamines of the present invention. The epoxy resin used was Epon 828 (Shell Chemical Corporation), which has an equivalent weight of 185–205. The anhydride curing agents were dimethylbutenyltetrahydrophthalic anhydride (sold as Beta-S by Heyden Newport Chemical Corporation) and methylendomethylenetetrahydrophthalic anhydride (sold as Methyl Nadic Anhydride by National Aniline Division, Allied Chemical and Dye Corporation). The resin compositions were prepared by mixing 195 grams of Epon 828 with the indicated amount of the catalyst and with 237 grams of Beta-S or with 153 grams of Methyl Nadic Anhydride and cured by heating the mixture in a mold for 16 hours at 120° C. and then for 1 hour at 180° C. The following table indicates the viscosity changes that occur in the uncured catalyzed systems on ageing and the heat distortion temperatures of the cured resins.

*Table*

| Catalyst | Amount of Catalyst (based on epoxy resin), percent | Gardner-Holdt Viscosity of Uncured Catalyzed System | | | Heat Distortion Temperature (° C.) of Cured Resin (ASTM D-648) |
|---|---|---|---|---|---|
| | | Original | After 1 Day | After 6 Days | |
| A. Curing Agent, Beta-S: | | | | | |
| Product of Example 1 | 2 | | | | 115 |
| Product of Example 6 | 1 | Z-2 | Z-3 | Z4-5 | 116 |
| | 2 | Z-4 | Z-5 | >Z-10 | 121 |
| | 3 | | | | 117 |
| | 4 | | | | 116 |
| Product of Example 7 | 1 | Z-1 | Z-1 | Z-6 | 122 |
| | 2 | | | | 128 |
| | 3 | Z-2 | Z-6 | >Z-10 | 134 |
| | 4 | | | | 128 |
| | 5 | | | | 127 |
| Product of Example 14 | 1 | | | | 114 |
| | 2 | | | | 119 |
| Standard amine catalyst (N,N-dimethylbenzylamine). | 1 | Z-2 | Z-2 | >Z-10 | 117 |
| | 2 | | | | 123 |
| | 3 | | | | 123 |
| | 4 | Z-3 | Z-8 | >Z-10 | 123 |
| | 5 | | | | 120 |
| B. Curing Agent, Methyl Nadic Anhydride: | | | | | |
| Product of Example 6 | 1 | | | | 134 |
| | 2 | | | | 148 |
| | 3 | | | | 145 |
| | 4 | | | | 145 |
| Standard amine catalyst (N,N-dimethylbenzylamine). | 1 | | | | 122 |
| | 2 | | | | 123 |
| | 3 | | | | 140 |
| | 4 | | | | 140 |

If desired, other ingredients may be added to catalyzed polyurethane and epoxy resin compositions before they are cured. These include plasticizers, pigments, dyes, fillers, and the like.

We claim:

1. A dihydroxy diamine having the formula

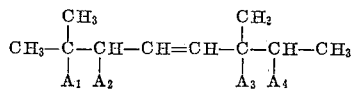

wherein two of the substituents $A_1$, $A_2$, $A_3$, and $A_4$ represent hydroxyl groups and the other two of said substituents represent groups having the formula —$NR_2$, wherein each R represents a member selected from the group consisting of hydrogen, alkyl groups having from 1 to 18 carbon atoms, hydroxyalkyl groups having from 1 to 6 carbon atoms, aminoalkylene groups having from 2 to 8 carbon atoms, phenyl, and benzyl and where the combination of $A_1$ and $A_2$ and the combination of $A_3$ and $A_4$ each contain one hydroxyl group and one —$NR_2$ group.

2. 2,3,6,7-(dihydroxy diamino)-2,6-dimethyl-octylene-4.

3. 2,3,6,7-[dihydroxy di(monomethylamino)]-2,6-dimethyl-octylene-4.

4. 2,3,6,7-[dihydroxy di(dimethylamino)]-2,6-dimethyl-octylene-4.

5. 2,3,6,7-[dihydroxy di(ethylenediamino)]-2,6-dimethyl-octylene-4.

6. 2,3,6,7-[dihydroxy di($\beta$-hydroxyethylamino)]-2,6-dimethyl-octylene-4.

7. 2,3,6,7-[dihydroxy di(phenylamino)]-2,6-dimethyl-octylene-4.

8. A process for the production of dihydroxy diamino-dimethyl-octylenes which comprises reacting allo-ocimene dioxide with a nitrogen-containing compound selected from the group consisting of ammonia, monoalkylamines having from 1 to 18 carbon atoms, dialkylamines in which each of the alkyl groups has from 1 to 18 carbon atoms, monoalkanolamines having from 1 to 6 carbon atoms, dialkanolamines in which each of the alkanol groups has from 1 to 6 carbon atoms, alkylenediamines having from 2 to 8 carbon atoms, aniline, N-methylaniline, diphenylamine, benzylamine, and mixtures thereof.

9. A process for the production of dihydroxy diamino-dimethyl-octylenes which comprises reacting allo-ocimene dioxide at a temperature in the range of 10°–120° C. with a nitrogen-containing compound selected from the group consisting of ammonia, monoalkylamines having from 1 to 18 carbon atoms, dialkylamines in which each of the alkyl groups has from 1 to 18 carbon atoms, monoalkanolamines having from 1 to 6 carbon atoms, dialkanolamines in which each of the alkanol groups has from 1 to 6 carbon atoms, alkylenediamines having from 2 to 8 carbon atoms, aniline, N-methylaniline, diphenylamine, benzylamine, and mixtures thereof thereby forming a reaction mixture containing dihydroxy-diamino-dimethyl-octylene, and thereafter recovering the dihydroxy diamino-dimethyl-octylene from said reaction mixture.

10. A process for the production of 2,3,6,7-(dihydroxy diamino)-2,6-dimethyl-octylene-4 which comprises reacting allo-ocimene dioxide with a stoichiometric excess of ammonia in the presence of water to form a reaction mixture containing 2,3,6,7-(dihydroxy diamino)-2,6-dimethyl-octylene-4, removing from said reaction mixture water and unreacted ammonia, and thereafter recovering said 2,3,6,7-(dihydroxy diamino)-2,6-dimethyl-octylene-4 from said reaction mixture.

11. A process for the production of 2,3,6,7-[dihydroxy di(dimethylamino)]-2,6-dimethyl-octylene-4 which comprises reacting allo-ocimene dioxide with dimethylamine to form a reaction mixture containing 2,3,6,7-[dihydroxy di(dimethylamino)]-2,6-dimethyl-octylene-4, and thereafter recovering said 2,3,6,7-[dihydroxy di(dimethylamino)]-2,6-dimethyl-octylene-4.

12. A process for the production of 2,3,6,7-[dihydroxy di(dimethylamino)]-2,6-dimethyl-octylene-4 which comprises reacting allo-ocimene dioxide with a stoichiometric excess of dimethylamine in the presence of water at a temperature in the range of approximately 25°–60° C. to form a reaction mixture containing 2,3,6,7-[dihydroxy di(dimethylamino)] - 2,6 - dimethyl-octylene-4, removing from said reaction mixture water and unreacted dimethylamine, and thereafter recovering said 2,3,6,7-[dihydroxy di(dimethylamino)]-2,6-dimethyl-octylene-4 from said reaction mixture.

References Cited in the file of this patent
UNITED STATES PATENTS

| | | |
|---|---|---|
| 2,329,619 | Jayne et al. | Sept. 14, 1943 |
| 2,850,532 | Simon | Sept. 2, 1958 |
| 2,901,445 | Harris | Aug. 25, 1959 |
| 2,901,462 | Anderson et al. | Aug. 25, 1959 |
| 2,902,471 | Bruin | Sept. 1, 1959 |
| 2,941,004 | Pinson et al. | June 14, 1960 |
| 2,953,533 | Khawam | Sept. 20, 1960 |
| 2,955,138 | McKeever et al. | Oct. 4, 1960 |

FOREIGN PATENTS

| | | |
|---|---|---|
| 467,579 | Great Britain | June 17, 1937 |
| 917,496 | France | Sept. 16, 1946 |

OTHER REFERENCES

Dupont Bulletin de la Societe Chimique de France [5], vol. 3, Part 1, pages 1026–1028 (1936).